3,084,186
PREPARATION OF ALKYL SULFONATES
Everett Clippinger, San Rafael, Calif., assignor to California Research Corporation, San Francisco, Calif., a corporation of Delaware
No Drawing. Filed Apr. 14, 1958, Ser. No. 728,082
7 Claims. (Cl. 260—513)

The present invention relates to the preparation of alkyl sulfonates by the addition of bisulfite ions to olefinic double bonds. More particularly, the invention has to do with an improved process for the addition of bisulfite to olefins to produce alkyl sulfonates useful in the preparation of detergents.

This application is a continuation-in-part of copending application Serial No. 715,859, filed February 18, 1958, now abandoned.

It has long been known that bisulfite ions can be added to olefinic double bonds in a liquid reaction medium in the presence of a reaction-initiating oxidizing agent.

Thus, U.S. Patent No. 2,318,036 discloses broadly the reaction between water-soluble bisulfite and acyclic or alicyclic unsaturated hydrocarbons in a liquid reaction medium, including water, and an oxidizing agent, particularly one yielding nascent oxygen under the conditions of reaction. The use of large amounts of bisulfite, reaction initiator, and solvent, as well as long reaction times, are taught in the patented process. In U.S. Patent No. 2,504,411 alkyl sulfonates are prepared by a sulfitation process based on the use of a particular combination of (1) solvent, and (2) a peroxide oxidizing agent, that is, one in which the peroxy group is attached to tertiary carbon. While yields of alkyl sulfonate are shown to be good with the lower olefins, the use of higher molecular weight olefins results in poorer yields. Patent No. 2,653,970 relates to a process for the addition of water-soluble bisulfite to olefins of higher molecular weight under carefully controlled pH conditions. Here also the use of large excess of bisulfite and sulfite are taught. In this patent, moreover, it is specifically taught that four phases are present during the reaction, i.e., olefin, alcohol, water saturated with salts and solid salts.

In summary, the prior art processes are deficient in one or more respects so that while alkyl sulfonates from olefins of say 5 to 20 carbon atoms are recognized to possess good detergent properties, they have not been utilized on a commercial scale.

Broadly, I have now discovered that alkyl sulfonates useful as detergents can be prepared in good yields economically and easily by conducting the bisulfite addition reaction in such manner as to maintain during reaction a reaction mixture consisting of not more than two liquid phases, that is, a predominantly liquid olefin layer or phase, and a liquid aqueous polar solvent phase containing dissolved bisulfite ion and olefin. In maintaining the two-liquid phase reaction system, the bisulfite ion is added during reaction in amounts below those which would give rise to the production of a third phase in the reaction medium. Although the reasons for the importance of carrying out the reaction under the conditions herein indicated are complex and not completely understood, mutual solubilities of the reactants in a single liquid phase, the efficiency of the initiator, surface effects of solid bisulfite salt are important considerations. Starting with a reaction system of olefin, initiator, and an aqueous-alcohol cosolvent system, it has been found that when the addition of aqueous bisulfite ion is made in such an amount that there are only two liquid phases present, the reaction proceeds rapidly to essential completion in a matter of two to three hours. However, when the initial addition of the aqueous bisulfite is made in an amount sufficient to produce additional phases, liquid or solid, or both, the reaction rate drastically drops with the results that long reaction times comparable to those described in the prior art are required. The phase relationships can, of course, be easily ascertained by visual inspection. Accordingly, in carrying out the invention an amount of bisulfite ion is added during the progress of the reaction to replenish that amount which is used up during reaction, care being exercised that excess sulfite which would form a third liquid or solid phase is not employed.

Expressed in other words, the sulfitation reaction is effected in the presence of free, or unreacted, bisulfite ion not exceeding a certain amount or concentration. Thus, it has been found that the presence of all of the bisulfite at once in the stoichiometric amount required to react with the olefin, yields a substantially inoperative process. As hereinabove indicated, maintenance of a reaction system of not more than two liquid phases can be effected by a controlled gradual addition of bisulfite ion at a rate approximately equal to its rate of consumption during the course of reaction until at least the stoichiometric amount of bisulfite ion has been reacted with the olefins. It has accordingly been found that the amount of unreacted bisulfite present during reaction and its rate of introduction into the reaction zone can be based on the amount of total olefin charge employed in the reaction, an amount of unreacted bisulfite ion over and above that consumed during reaction not exceeding about 25 mol percent of the olefin charged to the reaction zone being satisfactory.

Accordingly, in one embodiment of the invention olefin and bisulfite ion are introduced into the reaction zone in the presence of polar solvent and reaction-initiating agent under sulfitation conditions, in a mol ratio of bisulfite ion to olefin of about 0.05 to 0.25 preferably 0.1 to 0.15 whereby a two-liquid phase reaction medium is formed, further introducing into the reaction zone during the course of reaction additional bisulfite ion at a rate such as to maintain an amount of unreacted bisulfite ion in the reaction zone within the range of 0.05 to 0.25, preferably 0.1 to 0.15, mol per mol of original olefin introduced, and continuing the addition of bisulfite ion at least until the stoichiometric amount of bisulfite required to react with the olefin has been reached or up to an amount in excess of the stoichiometric amount, e.g., an amount expressed by the mol ratio of bisulfite ion to olefin of about 1.1. At the finish of reaction a substantially single phase system prevails.

The amount of bisulfite ion to be added during reaction may be ascertained not only by visual observation based on the maintenance of a two phase reaction system, but also by the periodic withdrawal of reaction mix sample for analysis of free bisulfite content. The sample can be analyzed for detergent content in known fashion [1], and the amount of free bisulfite content determined by titrating with iodine. Additional bisulfite is then added to make up for the amount used or up to the amount specified above.

In the teachings of the prior art, the olefinic materials used in the preparation of sulfonation products by the addition of bisulfite ion to olefin can be any of a broad class of unsaturated compounds apparently regardless of the position of the double bond or bonds and the molecular structure or nature of the unsaturated compound. On the other hand, the present invention is specifically applicable to olefinic material having a terminal olefinic bond, that is, α-olefins, which moreover can be characterized as being essentially α-monoolefins of essentially acyclic straight-chain structure or primary normal aliphatic 1-

---
[1] See Ralph House and J. L. Darragh, "Analysis of Synthetic Anionic Detergent Compositions," Analytical Chemistry, volume 26, No. 9, September 1954, pp. 1492–1497.

olefins of 5 to 20 carbon atoms in the molecule, the sulfonate of which is essentially a primary sulfonate, i.e., one in which the sulfonic acid radical is attached to terminal carbon. Accordingly, the olefin material entering into the reaction in accordance with the invention will be primarily and essentially of the type just described, although the olefin feed may contain other type olefins, e.g., secondary olefins or olefins with an internal bond, and impurities or contaminants, in limited amounts. These 1-olefins of 5 to 20 carbon atoms can advantageously be obtained by cracking petroleum wax. The olefins toward the upper limit of the specified carbon content, that is, those of higher molecular weight, because of their low solubility in water are used in the presence of a cosolubilizing reaction medium for both the olefin and the bisulfite. This medium comprises water and a polar solvent, which may be an alcohol, e.g., methanol or ethanol or a nitrogen-containing solvent, e.g., pyridine or hexanolamine. It may also be found advantageous to pretreat the olefinic material prior to reaction to remove undesirable impurities. This may be effected, for example, by passing the olefin feed over or through an adsorbent material, e.g., silica gel. Generally, a silica gel treatment of impurities by adsorption of about 1 to 5 volume percent of olefin feed will result in a very satisfactory olefin feed for the bisulfite addition reaction as herein contemplated.

Similarly uncritical is the type of reaction-initiating agent employed during the reaction. These may include molecular oxygen; electron irradiation; inorganic oxidizing compounds, such as the inorganic peroxides, e.g., hydrogen peroxide and sodium peroxide; organic peroxides, such as benzoyl peroxide and peracetic acid. Preferred are the organic peroxides in which the peroxy group is attached to at least one tertiary carbon atom, such as tertiary-butyl perbenzoate, tertiary-butyl pertoluate, 2,2-bis-(tertiary-butyl-peroxy) butane, ditertiary-butyl peroxide, and tertiary-butyl perphthalate (ortho compound), suitable amounts of which range from about 0.001 to 0.1 mol per mol of olefin, with preferred amounts ranging from about 0.005 to 0.05 mol per mol of olefin.

In general, in order to effect the reaction in a two-phase liquid system, amounts of organic solvent and water are employed such as to maintain a maximum of olefin and bisulfite in solution, i.e., to effect proportions of solvent and water such as to maintain the optimum balance of water-organic solvent to provide for good solubilizing effect for both the olefin and bisulfite. Thus, the water-organic solvent balance is such that the solubilizing efficiency of the organic solvent for the olefin is not unduly impaired with too much water, and on the other hand, that the solubility of the water for the bisulfite ion is not unduly adversely affected by the presence of too much organic solvent.

Accordingly, a suitable reaction mix for most purposes can be formed by employing an aqueous solution or mixture of the organic solvent, e.g., methanol or ethanol, in concentration of 40 to 90%, preferably 50 to 85%, by volume. Additional water is introduced into the reaction system with the addition of the bisulfite, e.g., ammonium bisulfite. Based on the amount of water and organic solvent above specified, bisulfite solutions of 2 to 5 molar, preferably 3 to 4, will be found satisfactory. On the other hand, the amount of organic solvent present in the reaction can vary from about 75 to 150 volume percent of the olefin or more.

While, as above suggested, the best source of bisulfite ion in carrying out the invention has been found to be ammonium bisulfite, other sources for bisulfite ion heretofore employed in the bisulfite addition reaction are satisfactory. Accordingly, for certain purposes sodium bisulfite, calcium bisulfite and magnesium bisulfite may be found satisfactory.

While control of pH is not critical to the invention, it has been found that maintenance of pH in the aqueous phase during reactions is advantageous and represents an important refinement feature of the invention. In general, it is preferred to operate with a pH of about 7.0 to 8.5 in the aqueous phase. This may be accomplished by the addition of a basic material, e.g., sodium or ammonium hydroxide, to the bisulfite solution in an amount calculated to give the desired pH.

It is often also advantageous to effect reaction in the presence of a small amount of preformed sulfonate, as from a preceding run. Accordingly, a small amount of preformed sulfonate up to about 15 mol percent, based on olefin to be reacted, will be found advantageous.

The temperature employed during reaction can vary widely, from a low of about 50° C. to a high of 200° C. For the preferred organic peroxide initiators, temperatures ranging from about 75° C. to 100° C. will be found highly suitable.

Practice of this invention and the improvement over the art are demonstrated in the examples to follow, yields being in mol percent based on olefin charge. The recovery of the sulfonate can simply be effected by evaporating or boiling off the alcohol and water. If desired, and where indicated, following the sulfitation reaction a de-oiling step can be performed to remove unreacted hydrocarbons. These can be removed by extraction with a light hydrocarbon, e.g., pentane or by dilution with water to effect phase formation of the oil and sulfonate, followed by separation of the phases as by decantation. Alcohol and water can then be removed from the sulfonate layer by heating to distill off or evaporate the alcohol and water.

When all the reactants are placed in a reaction vessel as indicated in Example 1, there are three liquid phases and a solid phase present at the start, and the results are as described, when no provision is made for pH control. With pH control, Example 2, the yield is only slightly improved.

*Example 1*

Into a 1-liter 3-necked flask equipped with a reflux condenser, a glass stirrer and a thermometer are placed 100 ml. of methanol, 111 ml. of dodecene (0.5 mol), 220 ml. of a 2.5 molar ammonium bisulfite aqueous solution, and 1 g. tertiary-butyl perbenzoate. The contents of the flask are heated, while stirring, at refluxing temperatures (about 75° C.). After 7 hours the yield of sulfonate is determined to be 4.2% based on olefin charge.

*Example 2*

Example 1 is repeated except that the ammonium bisulfite contained 5.5 cc. of 28% ammonium hydroxide. The pH during this addition varied from 6.5 to 8 as measured by Calomel electrodes placed in the reaction mixture. The yield is determined to be 10.5%, based on olefin, after 7 hours.

However, as shown in Example 3, when the addition of the aqueous bisulfite ion in solution is made to the reaction medium at the proper rate, there is a markedly significant improvement in the yield and rate of conversion to the desired n-alkyl sulfonate. When the bisulfite addition rate exceeds the preferred rate as in Example 4, the yield and conversion rates are not as good as in the preceding example, but they are still much better than in the case where all the reactants are dumped into the reaction vessel at once. And finally, in Example 5, when pH control is incorporated into the process of Example 3, there is an additional incremental improvement in yield to 99% of theory.

*Example 3*

Example 1 is repeated except that the ammonium bisulfite solution is added over a three-hour period, and in such amounts that free, unreacted bisulfite during reaction does not exceed 25 mol percent of the olefin charged to the reaction zone as determined by withdrawal of small aliquot samples of reaction mix every hour and analyzed for sulfonate content. The time of heating from start to finish of the reaction is five hours. Yields of sulfonate is 95% based on olefin charged to the reaction zone.

*Example 4*

Example 3 is repeated by adding the bisulfite in proportions such as to maintain a concentration of bisulfite ion at 33 mol percent based on olefin during addition of the bisulfite (220 ml. of 2.5 molar bisulfite). After five hours of heating, from start to finish, the yield drops to 65%, based on olefin.

*Example 5*

Example 2 is repeated except that the ammonium bisulfite is added over a three-hour period, and in such manner as to provide in the reaction zone a mol ratio of bisulfite ion to olefin not exceeding 0.25. The yield after 5 hours total reaction time of dodecene sulfonate is determined to be 99%, based on olefin.

In Example 6, a further demonstration is made of the importance of having only two liquid phases present during the course of the addition. Even though the reaction is started under optimum conditions, and it is shown to be proceeding in the expected manner, the presence of the third phase developed by a too rapid addition of the aqueous bisulfite almost completely stops the reaction. Upon removal of the third phase (aqueous-salt solution) and upon adjustment of the rate of aqueous bisulfite addition to a preferred value, there results the resumption of the reaction as in Example 5 above.

*Example 6*

Example 5 is repeated except that after the ammonium bisulfite addition is started and the reaction is proceeding as in 5 above, sufficient of the aqueous bisulfite solution is added such as to produce a third liquid phase. The reaction of the bisulfite with the olefin essentially stops. The third phase is removed and the aqueous solution is added at a rate which does not develop the third liquid phase. The reaction immediately takes up and proceeds as in 5 above.

Solvent effects can be appreciable. This is indicated in Examples 7 and 8 where ethanol is used in place of methanol. The slow, controlled addition of the aqueous bisulfite results, with ethanol as with methanol, in a large improvement in rate of sulfonate formation. Also, by comparison of Example 3 with 8, it is clear that ethanol is the better solvent, especially with the $C_{12}$–$C_{20}$, and higher, olefins.

*Example 7*

Example 1 is repeated except that ethanol is used as solvent in place of methanol. The yield is determined to be 14% based upon olefin after 7 hours reaction time.

*Example 8*

Example 3 is repeated using ethanol in place of methanol. The yield after only 2 hours reaction time is determined to be 98%, based on olefin charge.

*Example 9*

Example 8 is repeated using 0.5 mol of tetradecene-1. After four hours reaction time the yield is 94%, based on olefin charge.

*Example 10*

0.5 mol decene-1, 1 g. t-butyl perbenzoate, 100 ml. methanol are placed in the reaction flask. 220 ml. of 2.5 M ammonium bisulfite solution is added over a period of 1½ hours, with stirring and heating to reflux temperature (about 75° C.). Yield, based on olefin charge, is 92%.

*Example 11*

0.75 mol hexadecene-1, 1 g. t-butyl perbenzoate, 300 ml. ethanol, 150 ml. $H_2O$ and 15 mol percent, based on olefin charge, of detergent heel, that is, sulfonate from a previous run, are placed in the reaction flask. 160 ml. of 5 M ammonium bisulfite solution is added over a period of 2 hours with stirring and heating at about 75° C. to 80° C. for 3 hours. Yield is 71%, based on olefin charge.

*Example 12*

0.5 mol octadecene-1, 1 g. t-butyl perbenzoate, 150 ml. ethanol are placed in the reaction flask with a 15 mol percent, based on olefin, heel of detergent in 50 ml. $H_2O$. 110 ml. of 5 M basic ammonium bisulfite solution is added over a period of 3 hours (pH of reaction mix around 7). Yield is 71%, in 4.5 hours, based on olefin charge.

*Example 13*

0.5 mol of silica gel treated $C_{11}$–$C_{13}$ cracked wax olefins, 100 ml. ethanol, 1 g. t-butyl perbenzoate are placed in the reaction flask. 220 ml. of 2.5 M ammonium bisulfite added in 3 hours while heating at about 75° C. and stirring. After 6½ hours yield of deoiled sulfonate is 91%, based on olefin charge.

*Example 14*

0.5 mol of silica gel-treated $C_{14}$–$C_{16}$ cracked wax olefins, 100 ml. ethanol, 1 g. t-butyl perbenzoate are placed in the reaction flask. 220 ml. 2.5 M ammonium bisulfite are added over a 3 hour period with stirring and heating to reflux. Heating is continued for another 8 hours. Yield of deoiled sulfonate is 94%.

*Example 15*

0.5 mol of silica gel-treated $C_{10}$–$C_{20}$ cracked wax olefins (average carbon content 14.5), 150 ml. ethanol, 1 g. t-butyl perbenzoate are placed in the flask. 220 ml. 2.5 M ammonium bisulfite are added over a period of 2½ hours with stirring and heating to reflux. Yield of deoiled sulfonate is 90% in 2½ hours.

*Example 16*

Into a glass flask provided with reflux condenser, thermometer, stirrer, pH glass electrodes and a bottom gas inlet, there are placed 0.5 mol dodecene-1 in 200 ml. of 65% aqueous ethanol containing 0.05 mol of dodecyl sulfonate obtained from a previous run. Into the flask ammonia is added dropwise and sulfur dioxide bubbled at the bottom at such a rate as to maintain the pH between 7–8, stirring and heating at reflux temperature being continued for 2 hours. At the end of 2 hours the yield of dodecyl sulfonate is 46%.

*Example 17*

Dodecene-1 (84.2 g., 0.5 mol) and 95% ethanol (200 ml.) were placed in a turboreactor equipped with stirrer, reflux condenser, high purity nitrogen inlet, dropping funnel, and a thin glass window. The mixture was heated under reflux and irradiated with electrons at a beam current of 50 microamperes and 2 mev., while basic 2.5 molar ammonium bisulfite (prepared by diluting 500 ml. of 5 molar ammonium bisulfite and 50 ml. of concentrated ammonium hydroxide to one liter) was added at an average rate of 1.6 ml. per minute. The reaction was followed by sampling the lower layer every 10 minutes and titrating 0.1 ml. aliquot with p-tertiary-octyl phenoxy ethoxy ethyl dimethyl benzyl ammonium chloride (Hyamine 1622, Rohm & Haas). The titer continued to rise for two hours at which time the reaction was stopped. Ammonium dodecylsulfonate (0.195 equivalent) was found. This corresponds to a 39% yield.

*Example 18*

When Example 17 is repeated except that the bisulfite is added all at one time, only about 1–2% of sulfonate is formed.

*Example 19*

0.75 mol of olefin of the type as in Example 15, 250 ml. ethanol, 45 ml. of H₂O and 0.086 mol (11.5%) of detergent heel from previous run are placed in the flask. 200 ml. of 4 M basic ammonium bisulfite is added over 1 hour 40 minutes (pH of reaction mix around 6.5–8). ¾ g. of di-t-butyl perphthalate as catalyst is added in 3 equal portions at the beginning after ½ hour and after 1 hour. Sulfonate after deoiling in a yield of 87% is formed in 2 hours.

I claim:

1. In the process of preparing surface-active sulfonates by the addition, in a reaction zone, of bisulfite ion to normal 1-olefin of 10 to 20 carbon atoms in the presence of a solvent therefor and a reaction-initiating agent, the improvement which comprises introducing into the reaction zone olefin and a solution of a bisulfite salt in an amount from 0.05 to 0.25 mol of bisulfite per mol of olefin introduced, further introducing into the reaction zone during the course of reaction additional bisulfite ion at a rate such as to maintain the amount of unreacted bisulfite ion in the reaction zone within the range of 0.05 to 0.25 mol per mol of olefin originally introduced, and continuing the addition of bisulfite ion at least until the stoichiometric amount of bisulfite required to react with the olefin has been reached.

2. The improvement according to claim 1 wherein the bisulfite ion is derived from ammonium bisulfite.

3. The improvement of claim 1 wherein the pH during reaction is maintained between about 7 and 8.5.

4. The improvement of claim 1 wherein the reaction is carried out in the presence of about 15 mol percent, based on olefin charge, of preformed sulfonate.

5. The improvement of claim 1 wherein the olefin is a $C_{10}$–$C_{20}$ normal 1-olefin derived from cracked petroleum wax.

6. The improvement of claim 5 wherein the bisulfite ion is derived from ammonium bisulfite, and the pH during reaction is maintained between about 7 and 8.5.

7. The improvement of claim 6, wherein the reaction is carried out in the presence of a small amount of preformed sulfonate.

References Cited in the file of this patent

UNITED STATES PATENTS

| | | |
|---|---|---|
| 2,318,036 | Werntz | May 4, 1943 |
| 2,504,411 | Harman | Apr. 18, 1950 |
| 2,653,970 | Fessler | Sept. 29, 1953 |

FOREIGN PATENTS

| | | |
|---|---|---|
| 682,207 | Great Britain | Nov. 5, 1952 |